March 28, 1939. W. BRAUER 2,151,893
BRAKE
Original Filed Aug. 6, 1936
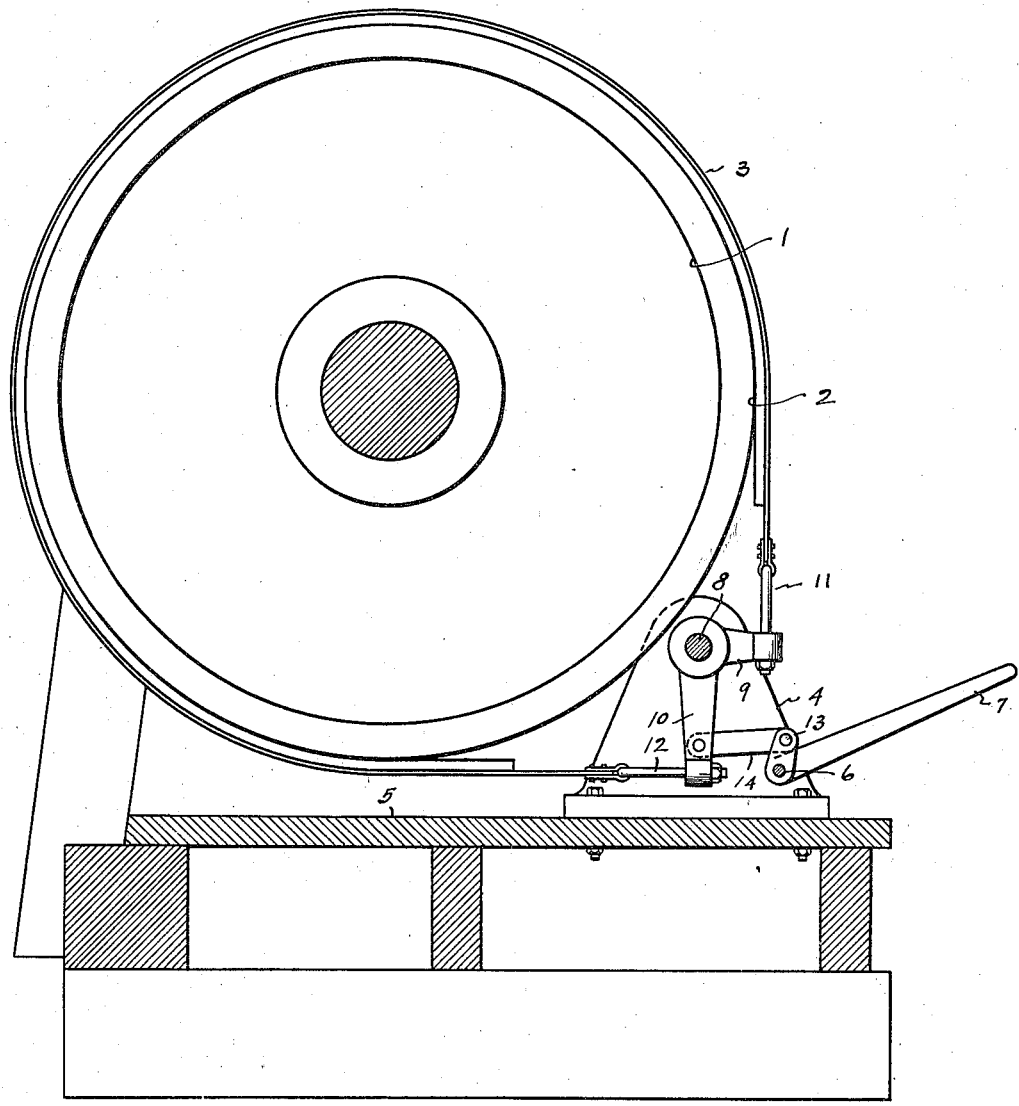
Inventor
Walter Brauer
By
Edward V. Hardway
Attorney Patented Mar. 28, 1939

2,151,893

UNITED STATES PATENT OFFICE 2,151,893

BRAKE

Walter Brauer, Oklahoma City, Okla.

Original application August 6, 1936, Serial No. 94,535. Divided and this application January 11, 1937, Serial No. 119,957

2 Claims. (Cl. 188—77)

This invention relates to brakes and has more particular relation to the operating mechanism therefor.

The present application constitutes a divisional application having been divided out of application Serial Number 94,535 for Brake filed by applicant on August 6, 1936.

An object of the invention is to provide a novel means for setting and releasing the brake band wherein the friction of the rotating drum with the band will aid in setting the brakes.

It is another object of the invention to provide a novel type of mechanical brake band operating mechanism to which the respective ends of the band are connected with manually operable means for applying the brake band to the brake drum, the construction being such that the friction of the drum with the band will assist in setting the brake and will equalize the brake action.

With the above and other objects in view, the invention has particular relation to certain novel features of construction, operation and arrangement of parts, an example of which is given in this specification and illustrated in the accompanying drawing, wherein:

The figure shows an end view of the brake drum showing the band operating mechanism.

Referring now more particularly to the drawing the numeral 1 designates the brake drum having the brake surface 2 around which the band 3 operates. The numeral 4 designates an upstanding bracket or stand which may be mounted on a derrick floor as 5. There is a transverse shaft 6 mounted in suitable bearings in the stand 4 and fixed to which there is an operating lever 7.

Mounted on the shaft 8, which is supported by the stand 4, there is a bell crank formed with a horizontal arm 9 and a depending arm 10, the latter of which is longer than the former. One end of the brake band is connected by the rod 11 to the free end of the arm 9 and the other end of the brake band is connected by the rod 12 to the free end of the arm 10. The shaft 6 has the upstanding arm 13 fixed thereon and link 14 connects the free ends of the arm 13 with the arm 10.

Upon depression of the lever 7 a pull will be exerted through the link 14, on the depending arm 10 which will be transmitted through the rod 12 to one end of the band 3, causing the band to grip the brake drum and the friction of said drum with the band will exert a pull upwardly on the rod 11 and the arm 9 which will, in turn, be transmitted to the arm 10 and rod 12 whereby the friction of the drum with the band will effectively operate to increase the gripping of the band about the drum and thus making it easy to operate the brake to set or released position.

The drawing and description discloses what is now considered to be a preferred form of the invention by way of illustration only, while the broad principle of the invention will be defined by the appended claims.

What I claim is:

1. Brake mechanism comprising a rotatable brake drum, a brake band partially around the drum, a brake actuating means effective to contract and expand the band against and away from the drum irrespective of the direction of rotation of the drum and including a pivotally mounted bell crank having arms of unequal length, means for connecting the ends of the band to the ends of the corresponding arms of the bell crank, a pivotally mounted operating lever, an actuating arm connected to and arranged to be operated by said lever, a link one end of which is pivoted to the free end of the actuating arm and the other end of which is connected to the longer of the bell crank arms between the pivotal point of the bell crank and the connection of the band to said longer arm.

2. A brake mechanism comprising a rotatable brake drum, a brake band substantially around the drum, a bell crank having arms of unequal length, means for connecting the ends of the band to the ends of the corresponding arms of the bell crank, the length of the band and the arms being such that rotation of the bell crank in one direction expands the band away from the drum and rotation in the other direction contracts the band against the drum, a pivotally mounted manual operating lever, an actuating arm connected to and arranged to be operated by said lever, and a link one end of which is pivoted to the free end of the actuating arm and the other end of which is connected to the longer of the bell crank arms between the pivotal point of the bell crank and the connection of the band to said longer arm.

WALTER BRAUER.